United States Patent [19]
Drew

[11] Patent Number: 5,612,578
[45] Date of Patent: Mar. 18, 1997

[54] VEHICLE ENGINE START CONTROL APPARATUS INCLUDING INTERFACE DEVICE FACILITATING INSTALLATION AND RELATED METHOD

[75] Inventor: Robert L. Drew, Bowdon, Ga.

[73] Assignee: Kenneth E. Flick, Douglasville, Ga.

[21] Appl. No.: 551,224

[22] Filed: Oct. 31, 1995

[51] Int. Cl.$^6$ .................................................. B60R 25/04
[52] U.S. Cl. ...................... 307/10.5; 180/287; 123/179.2
[58] Field of Search ............................... 307/10.1–10.16; 123/179.2–179.4; 340/825.3–825.32, 825.69, 825.72; 290/38 C; 180/287

[56] References Cited

U.S. PATENT DOCUMENTS

| | | | |
|---|---|---|---|
| 4,144,523 | 3/1979 | Kaplit | 340/825.31 |
| 4,148,372 | 4/1979 | Schroeder | 180/287 |
| 4,672,225 | 6/1987 | Hanisko et al. | 307/10.2 |
| 4,804,856 | 2/1989 | Hanisko et al. | 307/10.2 |
| 4,990,906 | 2/1991 | Kell et al. | 340/825.31 |
| 5,024,186 | 6/1991 | Long et al. | 123/179.2 |
| 5,040,990 | 8/1991 | Suman et al. | 307/10.1 |
| 5,042,439 | 8/1991 | Tholl et al. | 123/179.2 |
| 5,086,288 | 2/1992 | Stramer | 307/10.3 |
| 5,184,584 | 2/1993 | Cantrell | 123/179.2 |
| 5,323,140 | 6/1994 | Boyles | 180/287 |

*Primary Examiner*—Richard T. Elms
*Attorney, Agent, or Firm*—Allen, Dyer, Doppelt, Milbrath & Gilchrist, P.A.

[57] ABSTRACT

A remote engine starting apparatus is for installation in a vehicle for bypassing a theft-deterring start control circuit to permit remote starting of a vehicle engine. The theft-deterring start control circuit includes: an ignition switch for receiving a designated key having a preselected resistance, a first connector coupled to the ignition switch, a resistance sensing circuit portion for preventing starting of the vehicle engine unless the preselected resistance is sensed, and a second connector coupled to the resistance sensing circuit portion. The second connector is preferably matable with the first connector. The remote engine starting apparatus includes an interface device which, in turn, includes: a housing, a bypass circuit comprising a bypass resistor and a switching relay for selectively coupling the bypass resistor to the resistance sensing circuit portion to thereby enable starting of the vehicle engine without the designated key being in the ignition switch. Third and fourth connectors are coupled to the bypass circuit and are removably mated with the first and second connectors, respectively, of the theft-deterring start control circuit to facilitate installation and removal of the interface device. A receiver is operatively connected to the bypass circuit for coupling the bypass resistor to the resistor sensing circuit portion to enable engine starting responsive to receiving the remote engine starting signal from the remote transmitter.

38 Claims, 3 Drawing Sheets

VEHICLE ENGINE START CONTROL APPARATUS INCLUDING INTERFACE DEVICE FACILITATING INSTALLATION AND RELATED METHOD

FIELD OF THE INVENTION

The present invention relates to the field of motor vehicles, and, more particularly, to an apparatus and related method for remote starting a vehicle engine.

BACKGROUND OF THE INVENTION

Vehicle security systems are widely used to deter vehicle theft, prevent theft of valuables from a vehicle, deter vandalism, and to protect vehicle owners and occupants. A typical automobile security system, for example, includes a central processor or controller connected to a plurality of vehicle sensors. The sensors, for example, may detect opening of the trunk, hood, doors, windows, and also movement of the vehicle or within the vehicle. Ultrasonic and microwave motion detectors, vibration sensors, sound discriminators, differential pressure sensors, and switches may be used as sensors. In addition, radar sensors may be used to monitor the area proximate the vehicle.

The controller typically operates to give an alarm indication in the event of triggering of a vehicle sensor. The alarm indication may typically be a flashing of the lights and/or the sounding of the vehicle horn or a siren. In addition, the vehicle fuel supply and/or ignition power may be selectively disabled based upon an alarm condition.

A vehicle security system may be an aftermarket unit installed after manufacture and initial delivery of the vehicle. A vehicle security system may also be installed as original equipment during the manufacture of the vehicle. In addition, hybrid security systems may also be desirable where a user needs one or more additional functions or features that are not available with an original equipment security system alone.

At least one automobile manufacturer includes a theft-deterring circuit based upon use of designated ignition key having a preselected electrical resistance in a portion thereof. For example, the VATS and newer VATS II systems are used in certain General Motors vehicles to deter vehicle theft. The preselected resistance of the ignition key may typically be one of fifteen values, for example. A resistance sensing circuit portion measures the resistance of the key and will not permit starting and/or running of the vehicle engine unless the preselected resistance is sensed.

Unfortunately, the VATS systems may cause compatibility problems with aftermarket security or remote operating units, such as for remote starting of the vehicle engine. For example, one conventional approach to incorporating a remote start capability in a vehicle including a VATS theft-deterring circuit requires cutting the relatively small gauge wires of the ignition circuit and splicing interconnecting wires thereto. The interconnecting wires are coupled to a switching relay which selectively inserts the predetermined resistance into the ignition circuit thereby permitting remote starting of the vehicle, such as based upon a remote start signal received from a remote hand held transmitter. Remote starting may be desirable in warm or cold climates to allow the air conditioner or heater to operate to achieve a comfortable interior temperature. In addition, a remote start feature may be desirable in certain security related applications to remotely check for sabotage or tampering with the vehicle.

Significant disadvantages are presented by conventional cutting and splicing into the original equipment wiring. For example, considerable time and labor may be required, and the cutting and splicing also increases the chance of errors and may create longer term reliability problems. In addition, a vehicle manufacturer may typically discourage cutting of any original equipment wiring, such as to bypass a VATS system, by disclaiming warranty provisions if original equipment wires are severed.

An example of a remote starting aftermarket unit is disclosed in U.S. Pat. No. 5,184,584 to Cantrell and entitled "Remote Starter for Alarm System Equipped Vehicles". The patent discloses a switching relay and adjustable bypass resistor for interfacing with a VATS-equipped vehicle along the lines described above. The bypass resistance is provided by an adjustable potentiometer that may be difficult to adjust to the desired resistance. Moreover, a potentiometer may drift over time, thereby providing unreliable long term operation.

SUMMARY OF THE INVENTION

In view of the foregoing background, it is therefore an object of the invention to provide an apparatus and related method for permitting remote starting and operation of a vehicle engine for a vehicle equipped with a theft-deterring start control circuit of a type which is operable by a designated key having a preselected resistance.

It is another object of the invention to provide an apparatus and related method for permitting remote starting and operation of a vehicle engine, for a vehicle equipped with a theft-deterring start control circuit, and which is readily installed and connected to other vehicle components.

It is yet another object of the invention to provide an apparatus and related method for permitting remote starting and operation of a vehicle engine, for a vehicle equipped with a theft-deterring start control circuit, and which has enhanced reliability.

These and other objects, features, and advantages of the present invention are provided by a remote engine starting apparatus for installation in a vehicle for bypassing a theft-deterring start control circuit to permit remote starting of a vehicle engine. The theft-deterring start control circuit preferably comprises an ignition switch for receiving a designated key having a preselected resistance, a first connector coupled to the ignition switch, a resistance sensing circuit portion for preventing starting of the vehicle engine unless the preselected resistance is sensed, and a second connector coupled to the resistance sensing circuit portion. The second connector is matable with the first connector and is so mated when delivered from the manufacturer. The remote engine starting apparatus preferably comprises an interface device or module that is readily installed and/or removed from a vehicle.

More particularly, the interface device preferably comprises a housing, and bypass means positioned in the housing. The bypass means preferably comprises a bypass resistor and switching means for selectively coupling the bypass resistor to the resistance sensing circuit portion of the theft-deterring start control circuit to thereby enable vehicle engine starting without the designated key being received in the ignition switch. The bypass resistor has the preselected resistance of the designated key. In addition, third and fourth connectors are preferably coupled to the bypass means and are removably mated with the first and second connectors, respectively, of the theft-deterring start control circuit to facilitate installation and removal of the interface device. The interface device may further include a plurality of conductors extending outwardly from the housing to the third and fourth connectors to further facilitate mounting of the housing and interfacing with the first and second connectors.

A remote transmitter may be provided for sending a remote engine starting signal. A receiver is preferably mounted in the vehicle and operatively connected to the bypass means for coupling the bypass resistor to the resistor sensing circuit portion to enable vehicle engine starting responsive to receiving the remote engine starting signal from the remote transmitter.

The bypass resistor is preferably a fixed value resistor for long term reliability and stability. The fixed value resistor preferably comprises a pair of outwardly extending leads. Moreover, the bypass means preferably further comprises a pair of spaced apart clip fasteners, carried by the housing, for removably securing the leads of the fixed value resistor to facilitate installation of a fixed value bypass resistor having the preselected resistance.

No splicing of the individual wires in the existing vehicle wiring is needed in the present invention. Rather, the invention provides a plug-in solution without requiring physical modification of the vehicle electrical system and also facilitates configuring with the desired resistor value. Accordingly, installation is simplified, and the apparatus may be readily removed and the vehicle restored to its original condition if so desired, thereby not adversely affecting warranty provisions relating to cutting factory wiring.

The interface device preferably further comprises engine starting means for starting the vehicle engine responsive to receipt of a remote engine starting signal. Moreover, the apparatus may also preferably comprise vehicle sensing means for sensing at least one predetermined vehicle condition; and a controller cooperating with the receiver and the vehicle sensing means for enabling starting of the vehicle engine responsive to both a sensed predetermined vehicle condition and receipt of a remote engine starting signal. For example, the vehicle sensing means preferably comprises at least one of a transmission selector position sensor, a hood position sensor, and a brake pressure sensor. The controller may also be used to implement shut off of the vehicle engine responsive to expiration of a predetermined time or in response to brake pressure, for example.

A method aspect of the present invention is for bypassing a theft-deterring start control circuit to permit remote starting of a vehicle engine. The theft-deterring start control circuit preferably comprises an ignition switch for receiving a designated key having a preselected resistance, a first connector coupled to the ignition switch, a resistance sensing circuit portion for preventing starting of the vehicle engine unless the preselected resistance is sensed, and a second connector coupled to the resistance sensing circuit portion. The second connector is matable with the first connector.

The method preferably comprises the step of: positioning in the vehicle an interface device to the theft-deterring start control circuit. The interface device preferably comprises a bypass resistor and switching means for selectively coupling the bypass resistor to the resistance sensing circuit portion of the theft-deterring start control circuit, and third and fourth connectors coupled to the bypass resistor and switching means. The method also preferably includes the steps of: disengaging the first and second connectors of the theft-deterring start control circuit from each other; and mating the third and fourth connectors of the interface device with the first and second connectors, respectively, of the theft-deterring start control circuit. The method may also include the steps of: identifying the preselected resistance of the designated key, and selecting a fixed value resistor having the identified preselected resistance.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
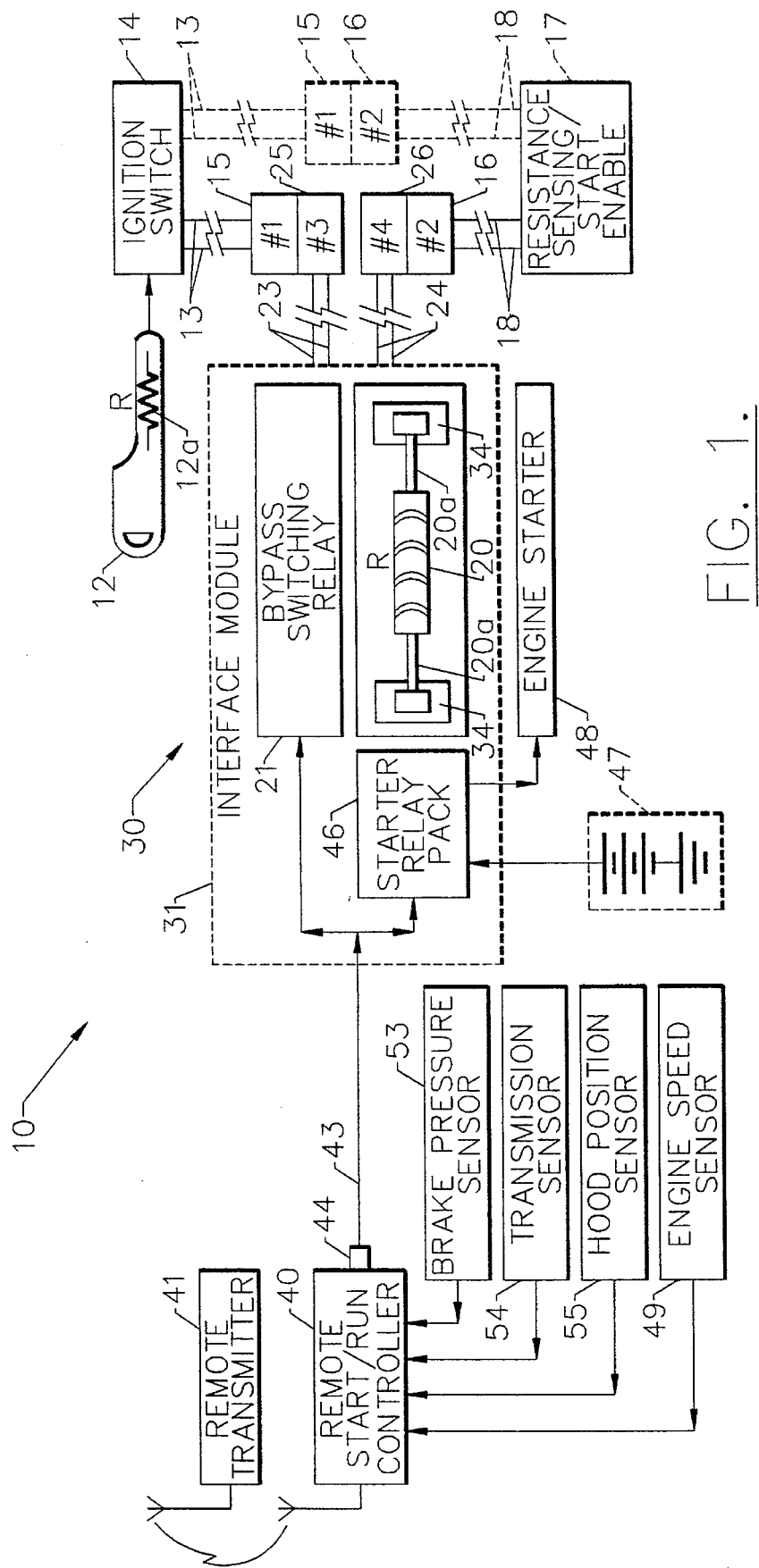
FIG. 1 is a schematic block diagram of the remote engine starting apparatus according to the invention.
Figure 2:
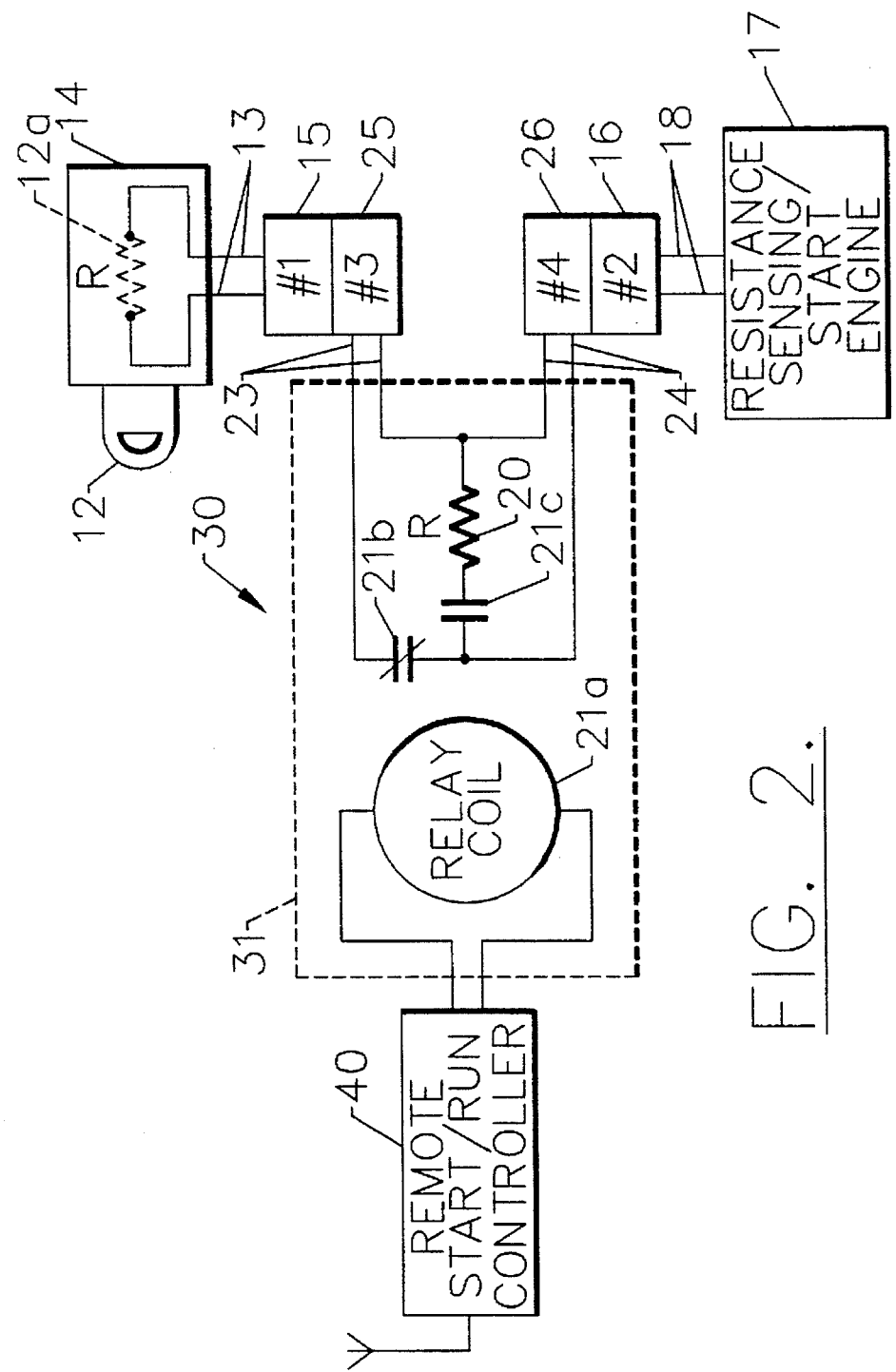
FIG. 2 is a schematic diagram of a portion of the remote engine starting apparatus according to the invention.

The apparatus for controlling starting of a vehicle engine according to the invention is first described with reference to FIGS. 1 and 2, and the apparatus is generally designated with reference numeral 10. The illustrated apparatus 10 includes a factory-installed or original equipment theft-deterring start control circuit for controlling engine starting to deter theft, unless a designated key 12 is positioned in the ignition switch 14. For example, the theft-deterring start control circuit may be provided by a General Motors VATS, VATS II, or similar theft-deterring circuit. The theft-deterring start control circuit comprises the illustrated ignition switch 14 for receiving therein the designated key 12 including a resistor portion 12a with a preselected resistance R. A first connector 15 is coupled to the ignition switch via a pair of conductors 13 as would be readily understood by those skilled in the art.

The theft-deterring start control circuit also includes resistance sensing means or circuit portion 17 for preventing starting of the vehicle engine unless the preselected resistance is sensed. In other words, starting of the vehicle engine is only enabled when the resistance sensing means 17 effectively "sees" the preselected resistance R. The operation of the vehicle fuel pump may also be dependent upon continuously sensing the preselected resistance. In other words, even if the engine is started, it will not run for long without sensing the resistance, because the fuel pump will be disabled.

A second connector 16 is coupled to the resistance sensing circuit portion 17 via the illustrated conductors 18. The second connector 16 is matable with the first connector 15, and is typically mated therewith when delivered from the manufacturer as shown by the dotted lines in the right hand portion of FIG. 1.

The first and second connectors 15, 16 are typically located in the vicinity of the steering column of the vehicle as will be readily understood by those skilled in the art. The first and second connectors 15, 16 may be conventional automotive-type matable male and female connectors, each including a molded plastic body portion carrying a plurality of pins or receptacles for removably receiving the pins, as would also be readily understood by those skilled in the art.

The apparatus 10 also includes bypass means for enabling starting of the vehicle engine without the designated key 12 being received in the ignition switch 14. The bypass means includes a bypass resistor 20 having the preselected resistance R, and resistor switching means provided by the illustrated relay 21 having a relay coil 21a and the illustrated normally closed contacts 21b and normally open contacts 21c (FIG. 2). The bypass switching relay 21 selectively couples the bypass resistor 20 to the resistance sensing circuit means 17 and while opening the circuit to the ignition switch 14 as shown in the illustrated embodiment. As would be readily understood by those skilled in the art, electronic or solid state devices may equivalently be used as switching means to selectively couple the bypass resistor 20 to the resistance sensing circuit 17.

An important feature of the present invention is the provision of a third connector 25 and a fourth connector 26 coupled to the bypass resistor 20 and switching relay 21 via respective third and fourth sets of conductors 23, 24 as illustrated. The third connector 25 is equivalent to the second connector 16 to thereby be removably matable with the first connector 15. Similarly, the fourth connector 26 is equivalent to the first connector 15 to thereby be removably matable with the second connector 16.

Accordingly, the bypass means in accordance with the present invention is readily installed in a vehicle having an existing theft-deterring circuit, such as the VATS or VATS II. Moreover, the bypass means may be readily installed without requiring cutting of the small gauge wires of the existing ignition and resistance sensing circuit. The bypass means may also be readily and easily removed by separating the connector pairs and remating the first and second connectors 15, 16 together. Other conductors, not shown, extending from the ignition switch 14 may be connected through or tapped into at the third and fourth connectors 25, 26 as would be readily understood by those skilled in the art.

The bypass means also preferably comprises a housing 31 mounting the bypass resistor 20 and resistor switching relay 21. The housing 31 may be formed of molded plastic, for example. The wiring harnesses provided by conductors 23, 24 and respective third and fourth connectors 25, 26 also extend outwardly from the housing 31 and define an interface module or device 30 along with the other components mounted by the housing and described in greater detail below.

The bypass resistor 20 is preferably a fixed resistor having a preselected resistance equal to the resistive portion 12a of the designated key 12. The fixed value resistor 20 may be a conventional carbon or wirewound precision resistor, as would be readily understood by those skilled in the art. The fixed value resistor 20 is not as likely to experience drift over time as would a potentiometer or variable resistor. The fixed value resistor 20 having the preselected resistance for a particular vehicle may be readily selected from among a plurality of resistor values commonly used in a VATS or VATS II system, for example.

As shown in the illustrated embodiment, the fixed value resistor 20 may include a pair of outwardly extending axial leads 20a. The leads 20a are preferably connected to other portions of the circuit via clip fasteners 34 as would be readily understood by those skilled in the art. The clip fasteners 34 provide reliable and secure electrical and mechanical connection to the leads 20a, to facilitate insertion and substitution of resistors if desired.

Operation of the interface module or device 30 is preferably controlled by the illustrated remote start/run controller 40. In addition, the remote start/run controller 40 may be triggered by a hand held remote transmitter 41 as may typically be carried by the vehicle operator or owner. A receiver in the remote start/run controller 40 receives a remote start signal from the remote transmitter 41 and sends a signal, via a connector 44 and a cable 43 to the interface module 30. The signal causes the bypass switching relay 21 to insert the bypass resistor 20 and isolate the ignition switch 14 to thereby permit starting and running of the vehicle engine without the designated key 12 being received in the ignition switch. In addition, the remote start signal causes the starter relay pack 46 to crank the engine starter 48 via the battery 47. Upon engine starting as determined by the engine speed sensor 49, for example, the starter 48 is disengaged, as would be readily understood by those skilled in the art.

To ensure that the vehicle engine is not started inadvertently or during certain undesirable conditions from a potential safety standpoint, the remote start/run controller 40 may be responsive to one or more of a brake pressure sensor 53, a transmission gear selector sensor 54, and/or a hood position sensor 55. Thus, starting of the vehicle engine may be prevented if the hood is open or the transmission is not in the "park" position, for example. In other words, one or more vehicle sensors cooperate with the receiver of the remote start/run controller 40 for enabling starting of the vehicle engine responsive to both a predetermined condition at the vehicle sensor and to receipt of a remote start signal from the remote transmitter 41.

The controller 40 of the apparatus 10 also preferably comprises shut off means for shutting off the vehicle engine after a predetermined time, such as ten minutes. Alternately, or in addition thereto, the shut off means may be triggered by sensing operation of the brakes. Other vehicle conditions for shutting off the vehicle engine are also contemplated by the invention and will be readily appreciated by those skilled in the art.

Figure 3:
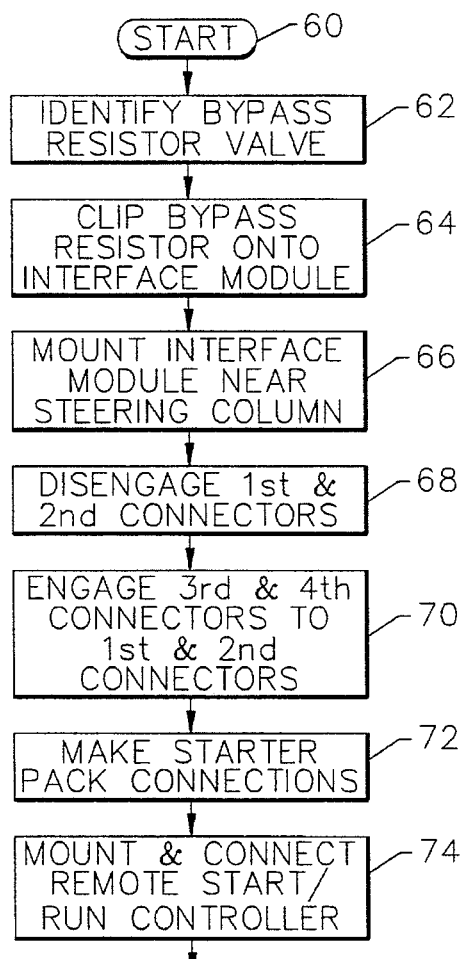
FIG. 3 is a flow chart illustrating operation of the remote engine starting apparatus according to the invention.
Figure 3:
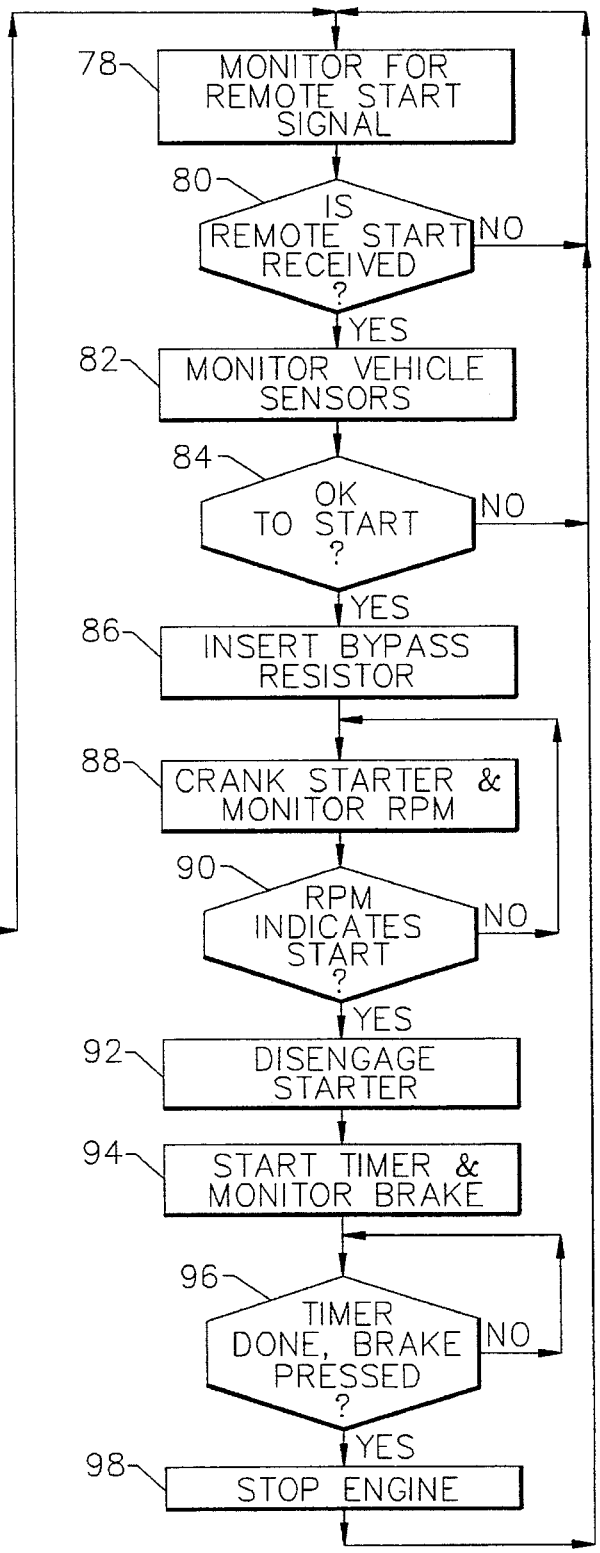

Turning now additionally to the flow chart of FIG. 3, installation and operation of the apparatus 10 according to the present invention is further described. From the start (Block 60) the preselected resistance value of the bypass resistor 20 is identified at Block 62 as would be readily understood by those skilled in the art. The fixed value bypass resistor 20 having the preselected resistance is mounted onto the clip fasteners 34 (Block 64) of the interface device 30. The interface device 30 may then be physically positioned in the vehicle at Block 66—typically near the steering column and under the dashboard area of the vehicle.

A significant advantage of the present invention is that electrical and mechanical interfacing to the existing theft-deterring start control circuit is relatively straightforward. The first and second connectors 15, 16 of the theft-deterring circuit are first disengaged at Block 68. The third and fourth connectors 25, 26 of the interface device 30 are then mated to the first and second connectors 15, 16, respectively (Block 70). The electrical connections to the starter relay pack 46 are established at Block 72, and the remote start/run controller 40 is mounted and electrically connected (Block 74) as would be readily understood by those skilled in the art.

Once installation of the bypass means including the interface module or device 30 is completed, the remote start/run controller 40 is powered to monitor for receipt of a remote start signal from the remote transmitter 41 at Block 78. If a remote start signal is received (Block 80), various vehicle conditions, such as hood position, brake pressure, and transmission selector position are monitored at Block 82. If the vehicle sensors indicate that starting can be effected at Block 84, the bypass resistor 20 is electrically inserted or coupled to the resistance sensing means 17 (Block 86).

The starter relay pack 46 effects cranking of the engine starter 49 at Block 88 to thereby start the engine. If the engine RPM is above a predetermined threshold, engine starting is indicated (Block 90), and, accordingly, the starter 48 can then be disengaged (Block 92). A timer and/or brake pressure can then be used as a trigger to stop the engine (Blocks 94, 96, and 98).

As would be readily appreciated by those skilled in the art, the interface device 30 and its associated third and fourth connectors 25, 26 may be readily removed from the vehicle, if desired. The first and second connectors 15, 16 may then be reconnected to return the vehicle wiring to its original condition.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A remote engine starting apparatus for bypassing a theft-deterring start control circuit to permit remote starting of a vehicle engine, the theft-deterring start control circuit comprising an ignition switch for receiving a designated key having a preselected resistance, a first connector coupled to the ignition switch, a resistance sensing circuit portion for preventing starting of the vehicle engine unless the preselected resistance is sensed, and a second connector coupled to the resistance sensing circuit portion, the second connector being matable with the first connector; said remote engine starting apparatus comprising:

an interface device comprising
   a housing,
   bypass means positioned in said housing and comprising a bypass resistor and switching means for selectively coupling the bypass resistor to the resistance sensing circuit portion of the theft-deterring start control circuit to thereby enable vehicle engine starting without the designated key being received in the ignition switch, said bypass resistor having the preselected resistance of the designated key,
   third and fourth connectors coupled to said bypass means and being removably mated with the first and second connectors, respectively, of the theft-deterring start control circuit to facilitate installation and removal of said interface device from the theft-deterring start control circuit;
a remote transmitter for sending a remote engine starting signal; and
a receiver operatively connected to said bypass means for coupling the bypass resistor to the resistance sensing circuit portion to enable vehicle engine starting responsive to receiving the remote engine starting signal from the remote transmitter.

2. A remote engine starting apparatus according to claim 1 wherein said bypass resistor is a fixed value resistor.

3. A remote engine starting apparatus according to claim 2 wherein said fixed value resistor comprises a pair of leads extending outwardly therefrom; and wherein said bypass means further comprises a pair of spaced apart clip fasteners carried by said housing for removably securing the leads of said fixed value resistor to facilitate installation of a fixed value resistor having the preselected resistance.

4. A remote engine starting apparatus according to claim 1 wherein said interface device further comprises engine starting means for starting the vehicle engine responsive to receipt of a remote engine starting signal.

5. A remote engine starting apparatus according to claim 4 further comprising:
   vehicle sensing means for sensing at least one predetermined vehicle condition; and
   a controller cooperating with said receiver and said vehicle sensing means for enabling starting of the vehicle engine responsive to both a sensed predetermined vehicle condition and receipt of a remote engine starting signal.

6. A remote engine starting apparatus according to claim 5 wherein said vehicle sensing means comprises at least one of a transmission selector position sensor, a hood position sensor, and a brake pressure sensor.

7. A remote engine starting apparatus according to claim 5 wherein said controller further comprises shut off means for shutting off the vehicle engine after a predetermined time.

8. A remote engine starting apparatus according to claim 5 wherein said controller further comprises shut off means for shutting off the vehicle engine responsive to brake pressure reaching a predetermined value.

9. A remote engine starting apparatus according to claim 1 wherein said switching means comprises a relay.

10. A remote engine starting apparatus according to claim 1 wherein said interface device further comprises a plurality of conductors extending outwardly from said housing to said third and fourth connectors.

11. An interface device for a theft-deterring start control circuit comprising an ignition switch for receiving a designated key having a preselected resistance, a first connector coupled to the ignition switch, a resistance sensing circuit portion for preventing starting of the vehicle engine unless the preselected resistance is sensed, and a second connector coupled to the resistance sensing circuit portion, the second connector being matable with the first connector; said interface device comprising:

a housing;
bypass means positioned in said housing and comprising a bypass resistor and switching means for selectively coupling the bypass resistor to the resistance sensing circuit portion of the theft-deterring start control circuit to thereby enable vehicle engine starting without the designated key being received in the ignition switch, said bypass resistor having the preselected resistance of the designated key; and
third and fourth connectors coupled to said bypass means and being removably mated with the first and second connectors, respectively, of the theft-deterring start control circuit to facilitate installation and removal of said interface device from the theft-deterring start control circuit.

12. An interface device according to claim 11 wherein said bypass resistor is a fixed value resistor.

13. An interface device according to claim 12 wherein said fixed value resistor comprises a pair of leads extending outwardly therefrom; and wherein said bypass means further comprises a pair of spaced apart clip fasteners carried by said housing for removably securing the leads of said fixed value resistor to facilitate installation of a fixed value resistor having the preselected resistance.

14. An interface device according to claim 11 further comprising engine starting means for starting the vehicle engine responsive to receipt of a remote engine starting signal.

15. An interface device according to claim 11 wherein said switching means comprises a relay.

16. An interface device according to claim 11 wherein said interface device further comprises a plurality of conductors extending outwardly from said housing to said third and fourth connectors.

17. An interface device for a theft-deterring start control circuit comprising an ignition switch for receiving a designated key having a preselected resistance, a first connector coupled to the ignition switch, a resistance sensing circuit portion for preventing starting of the vehicle engine unless the preselected resistance is sensed, and a second connector coupled to the resistance sensing circuit portion, the second connector being matable with the first connector; said interface device comprising:

bypass means comprising
a bypass resistor being a fixed value resistor having the preselected resistance,
switching means for selectively coupling the bypass resistor to the resistance sensing circuit portion of the theft-deterring start control circuit to thereby enable vehicle engine starting without the designated key being received in the ignition switch, and
a pair of spaced apart clip fasteners for removably securing said bypass resistor; and
third and fourth connectors coupled to said bypass means and being removably mated with the first and second connectors, respectively, of the theft-deterring start control circuit to facilitate installation and removal of said interface device from the theft-deterring start control circuit.

18. An interface device according to claim 17 further comprising:

a housing containing said bypass means; and engine starting means, positioned within said housing, for starting the vehicle engine responsive to receipt of a remote engine starting signal.

19. An interface device according to claim 17 wherein said switching means comprises a relay.

20. An interface device according to claim 17 further comprising a plurality of conductors coupled between said bypass means and said third and fourth connectors.

21. A remote engine starting apparatus for bypassing a theft-deterring start control circuit to permit remote starting of a vehicle engine, the theft-deterring start control circuit comprising an ignition switch for receiving a designated key having a preselected resistance, a first connector coupled to the ignition switch, a resistance sensing circuit portion for preventing starting of the vehicle engine unless the preselected resistance is sensed, and a second connector coupled to the resistance sensing circuit portion, the second connector being matable with the first connector; said remote engine starting apparatus comprising:

bypass means comprising a bypass resistor and switching means for selectively coupling the bypass resistor to the resistance sensing circuit portion of the theft-deterring start control circuit to thereby enable starting of the vehicle engine without the designated key being received in the ignition switch, said bypass resistor having the preselected resistance; and third and fourth connectors coupled to said bypass means and being removably mated with the first and second connectors, respectively, of the theft-deterring start control circuit.

22. A remote engine starting apparatus according to claim 21 further comprising:

a remote transmitter for sending a remote engine starting signal; and a receiver operatively connected to said bypass means for coupling the bypass resistor to the resistor sensing circuit portion to enable vehicle engine starting responsive to receiving the remote engine starting signal from the remote transmitter.

23. A remote engine starting apparatus according to claim 21 wherein said bypass resistor is a fixed value resistor.

24. A remote engine starting apparatus according to claim 23 wherein said fixed value resistor comprises a pair of leads extending outwardly therefrom; and wherein said bypass means further comprises a pair of spaced apart clip fasteners for removably securing the leads of said fixed value resistor to facilitate installation of a bypass resistor having the preselected resistance.

25. A remote engine starting apparatus according to claim 21 wherein said interface device further comprises engine starting means for starting the vehicle engine responsive to receipt of a remote engine starting signal.

26. A remote engine starting apparatus according to claim 25 further comprising:

vehicle sensing means for sensing at least one predetermined vehicle condition; and a controller cooperating with said receiver and said vehicle sensing means for enabling starting of the vehicle engine responsive to both a sensed predetermined vehicle condition and receipt of a remote engine starting signal.

27. A remote engine starting apparatus according to claim 26 wherein said vehicle sensing means comprises at least one of a transmission selector position sensor, a hood position sensor, and a brake pressure sensor.

28. A remote engine starting apparatus according to claim 26 wherein said controller further comprises shut off means for shutting off the vehicle engine after a predetermined time.

29. A remote engine starting apparatus according to claim 26 wherein said controller further comprises shut off means for shutting off the vehicle engine responsive to brake pressure reaching a predetermined value.

30. A remote engine starting apparatus according to claim 21 wherein said switching means comprises a relay.

31. A remote engine starting apparatus according to claim 21 further comprising a plurality of conductors extending between said bypass means and said third and fourth connectors.

32. A method for bypassing a theft-deterring start control circuit to permit remote starting of a vehicle engine, the theft-deterring start control circuit comprising an ignition switch for receiving a designated key having a preselected resistance, a first connector coupled to the ignition switch, a resistance sensing circuit portion for preventing starting of the vehicle engine unless the preselected resistance is sensed, and a second connector coupled to the resistance sensing circuit portion, the second connector being matable with the first connector; the method comprising the steps of:

positioning in the vehicle an interface device to the theft-deterring start control circuit to permit remote starting of the vehicle, the interface device comprising a bypass resistor and switching means for selectively coupling the bypass resistor to the resistor sensing circuit portion of the theft-deterring start control circuit, and third and fourth connectors coupled to the bypass resistor and switching means;

disengaging the first and second connectors of the theft-deterring start control circuit from each other; and mating the third and fourth connectors of the interface device with the first and second connectors, respectively, of the theft-deterring start control circuit to thereby removably install the interface device to the theft-deterring start control circuit.

33. A method according to claim 32 further comprising the steps of:

identifying the preselected resistance of the designated key; and selecting a fixed value resistor having the identified preselected resistance.

34. A method according to claim 33 wherein the fixed value resistor comprises a pair of leads extending outwardly therefrom; and wherein the interface device further comprises a pair of spaced apart clip fasteners; and further comprising the step of securing the leads of the fixed value resistor into respective clip fasteners of the interface device.

35. A method according to claim 32 further comprising the step of starting the vehicle engine responsive to receipt of a remote engine starting signal.

36. A method according to claim 35 further comprising the steps of:

sensing at least one predetermined vehicle condition; and enabling starting of the vehicle engine responsive to both a sensed predetermined vehicle condition and receipt of a remote engine starting signal.

37. A method according to claim 35 further comprising the step of shutting off the vehicle engine after a predetermined time.

38. A method according to claim 35 further comprising the step of shutting off the vehicle engine responsive to brake pressure reaching a predetermined value.

* * * * *